US009611665B2

(12) United States Patent
West

(10) Patent No.: US 9,611,665 B2
(45) Date of Patent: Apr. 4, 2017

(54) SAFETY-LINE ANCHOR

(71) Applicant: J. Stephen West, Kansas City, MO (US)

(72) Inventor: J. Stephen West, Kansas City, MO (US)

( * ) Notice: Subject to any disclaimer, the term of this patent is extended or adjusted under 35 U.S.C. 154(b) by 0 days.

(21) Appl. No.: 14/706,693

(22) Filed: May 7, 2015

(65) Prior Publication Data
US 2016/0326757 A1 Nov. 10, 2016

(51) Int. Cl.
E04G 21/32 (2006.01)
A62B 35/00 (2006.01)
E06C 1/34 (2006.01)
E06C 7/48 (2006.01)
F16B 2/00 (2006.01)
F16C 11/06 (2006.01)

(52) U.S. Cl.
CPC ...... *E04G 21/3276* (2013.01); *A62B 35/0068* (2013.01); *E04G 21/3214* (2013.01); *E04G 21/3261* (2013.01); *E06C 1/345* (2013.01); *E06C 7/488* (2013.01); *F16B 2/005* (2013.01); *F16C 11/06* (2013.01); *E04G 21/32* (2013.01); *E04G 21/3204* (2013.01)

(58) Field of Classification Search
USPC .... 248/690, 691, 227.1, 231.91, 294.1, 308, 248/340, 341, 499, 500; 52/698, 703; 182/3, 231, 5
See application file for complete search history.

(56) References Cited

U.S. PATENT DOCUMENTS

| 346,160 | A | | 7/1886 | Hughes | |
|---|---|---|---|---|---|
| 3,318,416 | A | | 5/1967 | Robinson | |
| 4,398,620 | A | | 8/1983 | Townsend | |
| 4,607,724 | A | * | 8/1986 | Hillberg | E04G 21/3261 182/3 |
| 5,730,407 | A | | 3/1998 | Ostrobrod | |
| 5,896,719 | A | | 4/1999 | Thornton | |
| 6,092,624 | A | | 7/2000 | Slater | |
| 6,668,509 | B1 | * | 12/2003 | Krebs | E04G 21/3261 248/499 |
| 6,913,114 | B1 | | 7/2005 | Blehm | |
| 7,185,739 | B1 | | 3/2007 | Blehm | |

(Continued)

FOREIGN PATENT DOCUMENTS

FR 2990986 11/2013
GB 2281093 2/1995
GB 2305208 4/1997

*Primary Examiner* — Alfred J Wujciak
(74) *Attorney, Agent, or Firm* — Erickson Kernell IP, LLC

(57) ABSTRACT

An anchor for a safety line for use in roofing construction and maintenance activities. The anchor includes a hooked body having a shank and a point. A safety line is coupleable between a free end of the shank and a user. An anchor plate is rotatably and pivotably coupled to the point via a joint disposed therebetween. The anchor is disposable over a peak of a roof with the anchor plate on a first side of the roof and the body extending over the peak toward a second side. A user tethered to the anchor may work on the second side of the roof; pivotal and rotational movement of the body relative to the anchor plate enabled by the joint aids to maintain the body generally in line with the safety line while the anchor plate remains frictionally engaged with the first side of the roof.

17 Claims, 4 Drawing Sheets

(56) References Cited

U.S. PATENT DOCUMENTS

| | | |
|---|---|---|
| 7,556,125 B1 | 7/2009 | Blehm |
| 8,186,479 B2 | 5/2012 | Vieira |
| 8,464,833 B2 | 6/2013 | Lee |
| 8,505,685 B1 | 8/2013 | Rayfield et al. |
| 8,596,414 B1 | 12/2013 | Lown |
| 8,752,801 B2 | 6/2014 | Parquette |
| 2007/0272811 A1 | 11/2007 | Baake |
| 2008/0277557 A1* | 11/2008 | Vetesnik ............ A62B 1/04 248/499 |
| 2011/0315478 A1 | 12/2011 | Foster, Sr. et al. |
| 2014/0008150 A1 | 1/2014 | Baglin |

\* cited by examiner

SAFETY-LINE ANCHOR

BACKGROUND

Construction, maintenance, and other activities that occur on the roofs of buildings and other structures present safety concerns and difficulties for workers tasked with completing the activities. The pitch of the roof along with a variety of conditions on the roof can lead to tripping, slipping, and sliding hazards causing workers to fall on the roof surface or fall off of the roof altogether. Such falls can lead to serious injury and even death.

Many attempts have been made to provide apparatus that give workers better footing and/or platforms from which to work while on the roof. A common method includes nailing a board to the roof structure to provide a small lip which workers can use as a toehold while working above the board. Once work is complete the board must be removed and holes or other damage to the roof must be repaired or mitigated.

Other apparatus have been developed are aimed at preventing or arresting falls on the roof and/or falling from the roof to the ground. These often include anchors that are coupled to the roof or the support structure thereof using fasteners such as bolts, screws, or the like. For example, U.S. Pat. No. 5,730,407 to Ostrobrod describes a system comprised of a roof anchor that is fastened to the roof structure with a safety line winch coupled thereto. The safety line can be coupled to a worker and, in the case of a fall, a centrifugal break in the winch acts to arrest the worker's fall. Such systems work well to reduce the risk of serious injury to workers from falling, but their installation and use causes damage to the roof structure and/or cladding disposed thereon that may require additional efforts to repair.

Other attempts have been made to provide roof safety apparatus that do not damage the roof structure and cladding. These typically include a hooked or L-shaped component that is disposed over the peak of the roof or around an edge thereof. A safety-line is coupled between a worker and the hooked component, such that when the worker falls or pulls on the safety line, the hooked component acts as an anchor securing the opposite end of the safety line to the roof. U.S. Patent Application Publication No. 2007/0272811 to Baake describes one such device. The Baake device includes a stabilizer member and an anchor member mounted perpendicularly to one another such that the device can be positioned over the peak of a roof with the anchor member on one side thereof and a safety line extending from the stabilizer on an opposite side of the peak. The device thus acts to anchor one end of the safety line to the peak of the roof without requiring fasteners to be installed into the roof structure. The design of the Baake device may work well when the safety line extends generally parallel to the stabilizer member but may be pulled away from the roof and/or the peak thereof when the safety line is pulled at an angle thereto. This could present considerable safety issues with operation of the device.

What is needed in the art is a safety-line anchor that is easily portable and installable on the roof without damaging the roof and that remains in an operable position without respect to the position of the user and/or safety line coupled thereto.

SUMMARY

Embodiments of the invention are defined by the claims below, not this summary. A high-level overview of various aspects of the invention is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes, among other things, a safety-line anchor that is removably installable on a roof without the use of fasteners or damaging the roof structure or cladding.

The safety-line anchor includes a hooked body having an elongate shank, a bend, and a point. A safetyline coupler is provided at a distal end of the shank and a slide-plate is disposed along the length thereof. The slide-plate comprises a generally planar component configured to slide along a roof surface as the body is pivoted about a joint coupled to the point. An anchor plate is provided for frictionally engaging the roof surface and is coupled to the joint opposite the hooked body. The joint enables the body to pivot and/or rotate relative to the anchor plate. The anchor plate is configured to distribute the forces placed on the safety-line anchor onto the roof surface and may include materials disposed on a face thereof configured to increase the friction or grip between the anchor plate and the roof surface.

In use, the safety-line anchor is placed overlying a peak of a roof with the face of the anchor plate in contact with the roof surface on one side of the peak and the slide-plate placed in contact with the roof surface on the other side of the peak. A safety line is coupled between the safety line coupler and a user. The user may keep tension on the safety line or the safety line may remain slack. When tension is applied to the safety line, the joint enables the body to pivot relative to the anchor plate and remain substantially in alignment with the safety line. The slide-plate provides a sliding surface between the body and the roof surface to aid movement of the body as it pivots about the joint.

DESCRIPTION OF THE DRAWINGS

Illustrative embodiments of the invention are described in detail below with reference to the attached drawing figures, and wherein.

DETAILED DESCRIPTION

Figure 2:
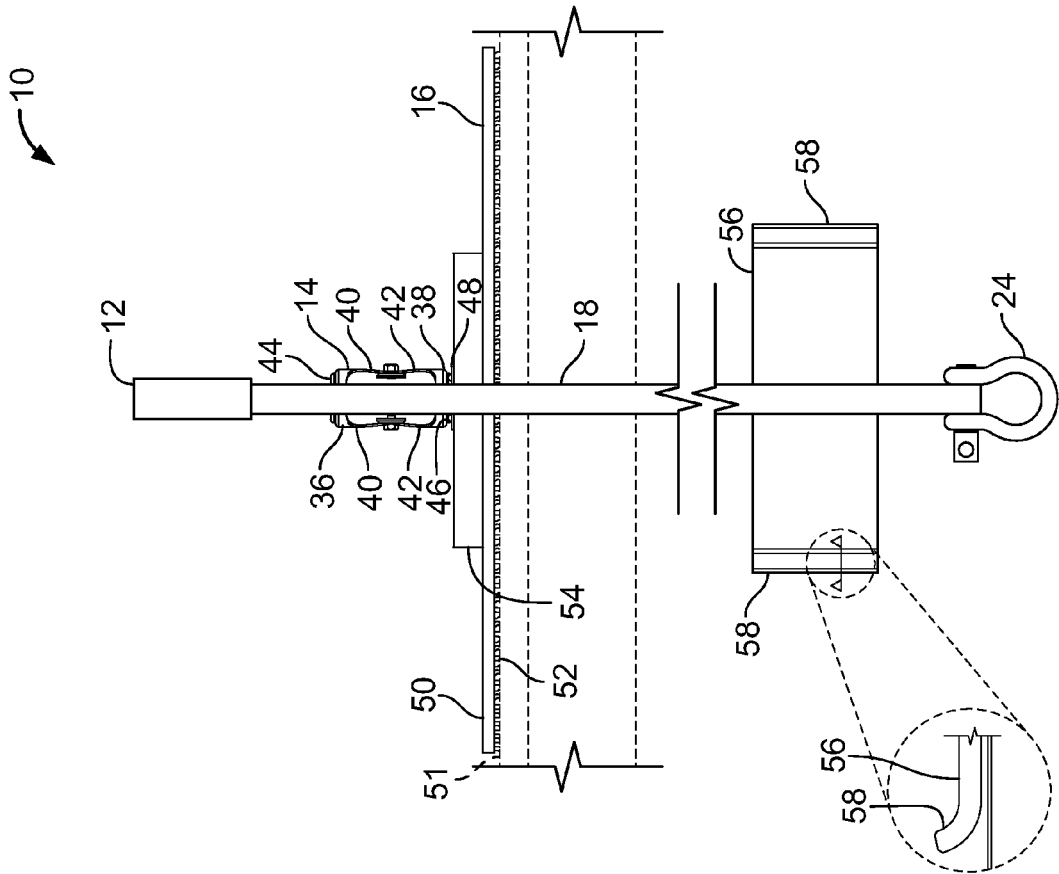
FIG. 2 is a front plan view of the safety-line anchor of FIG. 1.
Figure 1:
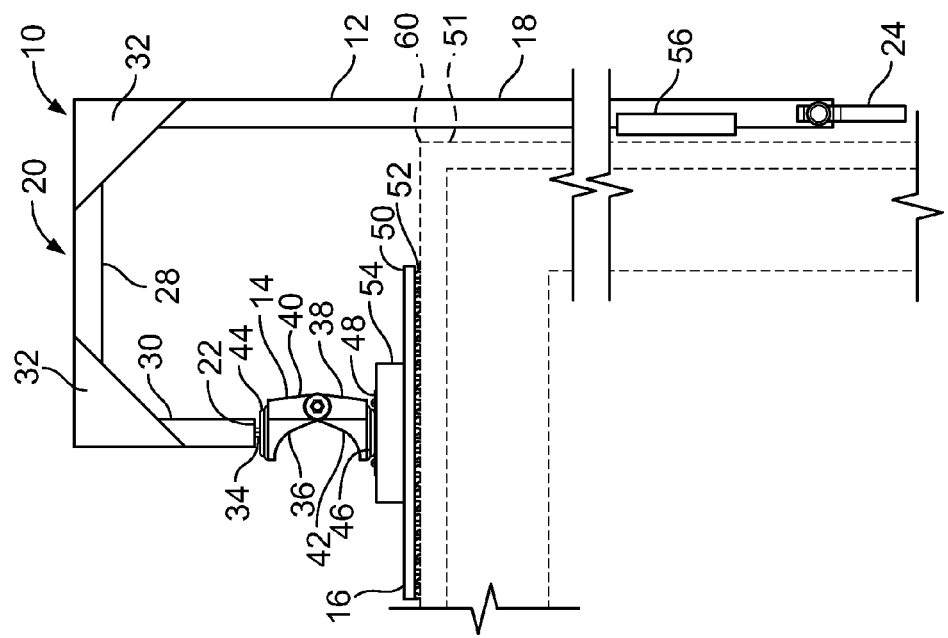
FIG. 1 is a side elevational view of a safety-line anchor depicted in accordance with an embodiment of the invention.
Figure 3:
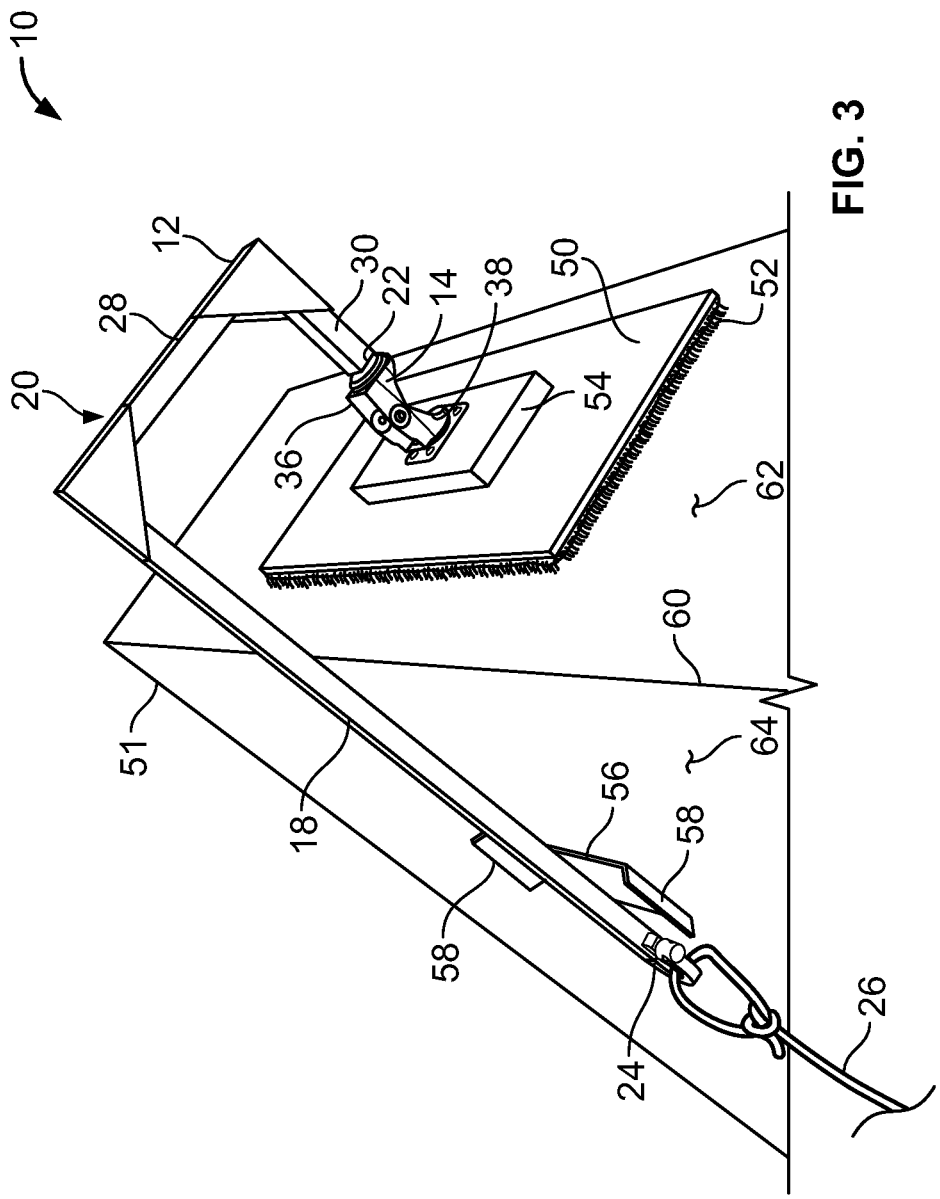
FIG. 3 is a side perspective view of the safety-line anchor of FIG. 1 disposed over a peak of a roof in accordance with an embodiment of the invention.

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" as used herein denote deviations from the exact value by +/−10%, preferably by +/−5% and/or deviations in the form of changes that are insignificant to the function.

With reference to FIGS. 1-4, a safety-line anchor 10 is described in accordance with an embodiment of the invention. The safety-line anchor 10 can be configured for use on pitched roofs having any of a wide variety of cladding thereon, e.g. asphalt, composite, slate, clay, wood, metal, or other forms of shingles or other cladding.

The anchor 10 comprises a hooked body 12, a joint 14, and an anchor plate 16. The hooked body 12 includes an elongate shank 18, a bend 20, and a point 22 formed by the terminus of the bend 20. The hooked body 12 is formed from one or more substantially linear sections of tubing or rod that are rigidly coupled at their ends, for example, by welding or fasteners among other methods. In one embodiment, the hooked body 12 may be formed from a single section of material that is bent or otherwise formed into a desired configuration. The shank 18 includes a coupler 24 at a free end thereof configured for coupling a safety line 26 to the body 12. As depicted in FIGS. 1-4, the coupler 24 may comprise a carabiner, a clevis, a ring, or another available component useable to couple to the safety line 26. The coupler 24 may be coupled to the shank 18 by, for example, inserting a portion of the coupler through an aperture in the shank 18. Or the coupler may be formed integral with the shank 18 or attached thereto via welding or other attachment means.

The safety line 26 typically comprises a rope but may also include a line, cord, chain, or other form of tether suitable for coupling between a user and the safety-line anchor 10 and for supporting the user in the event of a fall. In one embodiment, a winch or spool (not shown) on which the safety line 26 is disposed may be coupled to the coupler 24. Such a winch may include a brake that locks the winch from spooling out the safety line 26 when the line is pulled from the winch at a rate greater than a predetermined level, e.g. at a rate indicative of the user falling.

The bend 20 extends generally perpendicularly from a second end of the shank 18 a short distance before turning in a direction generally parallel to the shank 18 to provide the point 22. The point 22 is directed in substantially the same direction as the free end of the shank 18 but is positioned near or adjacent to the second end of the shank 18. The bend 20 thus provides the body 12 with a hooked or J-shaped form having one leg shorter than the other, in contrast to a U-shape in which both legs are substantially equal in length. As depicted in FIGS. 1-4, the bend 20 is formed from a cross-member 28 that extends perpendicularly to the shank 18, and a point-shank 30 that is coupled to the distal end of the cross-member 28 and generally perpendicularly thereto. Gussets 32 may be provided to reinforce the connections between the shank 18, the cross-member 28, and the point-shank 30. In another embodiment the bend 20 may be formed from a continuous curved section of material extending from the shank 18 or coupled thereto or from a greater plurality of sections joined together.

The point 22 is formed by the terminal end of the point-shank 30. In one embodiment, the point-shank 30 is omitted and the point 22 is provided by the terminal end of the cross-member 28 or by a portion of the cross-member 28 adjacent the terminal end. The point 22 is adapted to couple with the joint 14. As depicted in FIGS. 1-4, the point 22 includes a receiver or bore into which a pin 34 of the joint 14 can be inserted, however the joint 14 may be coupled to the point 22 using fasteners, welding, or any other method known in the art.

The joint 14 is disposed between the point 22 and the anchor plate 16 and provides both pivotal and rotational movement of the body 12 relative to the anchor plate 16. The joint 14 provides at least one rotational axis and one pivotal axis about which the body 12 can move relative to the anchor plate 16; preferably the joint 14 provides at least two rotational axes and a pivotal axis. The joint 14 includes an upper and a lower U-shaped member 36, 38 that are pivotably coupled near distal ends of their respective arms 40, 42. The pin 34 is rotatably coupled to the upper U-shaped member 36 centrally along the apex of the U-shape, such as via a bearing assembly 44 disposed at the apex of the member 36. The lower U-shaped member 38 also includes a bearing assembly 46 or other rotatable coupling disposed generally centrally along the apex of the U-shape thereof. The bearing assembly 46 includes a mounting plate 48 for attaching the anchor plate 16 to the lower member 38, such as by using one or more fasteners installed through the mounting plate 48.

The arms 40, 42 of the upper and lower members 36, 38 respectively are configured to position the distal ends thereof in a position that is offset from the rotational axes of the respective bearing assemblies 44, 46. As such, the pivot axis between the upper and lower members 36, 38 is offset from the rotational axes of the bearing assemblies 44, 46. This configuration may aid to prevent binding of the joint 14 during movements of the body 12 by a user. Although a particular configuration of the joint 14 is described herein, such description is not intended to be limiting on the scope of embodiments of the invention; other joint configurations that enable both pivotal and rotational movements between the body 12 and the anchor plate 16 may be employed in embodiments of the invention without departing from the scope described herein.

Figure 5:
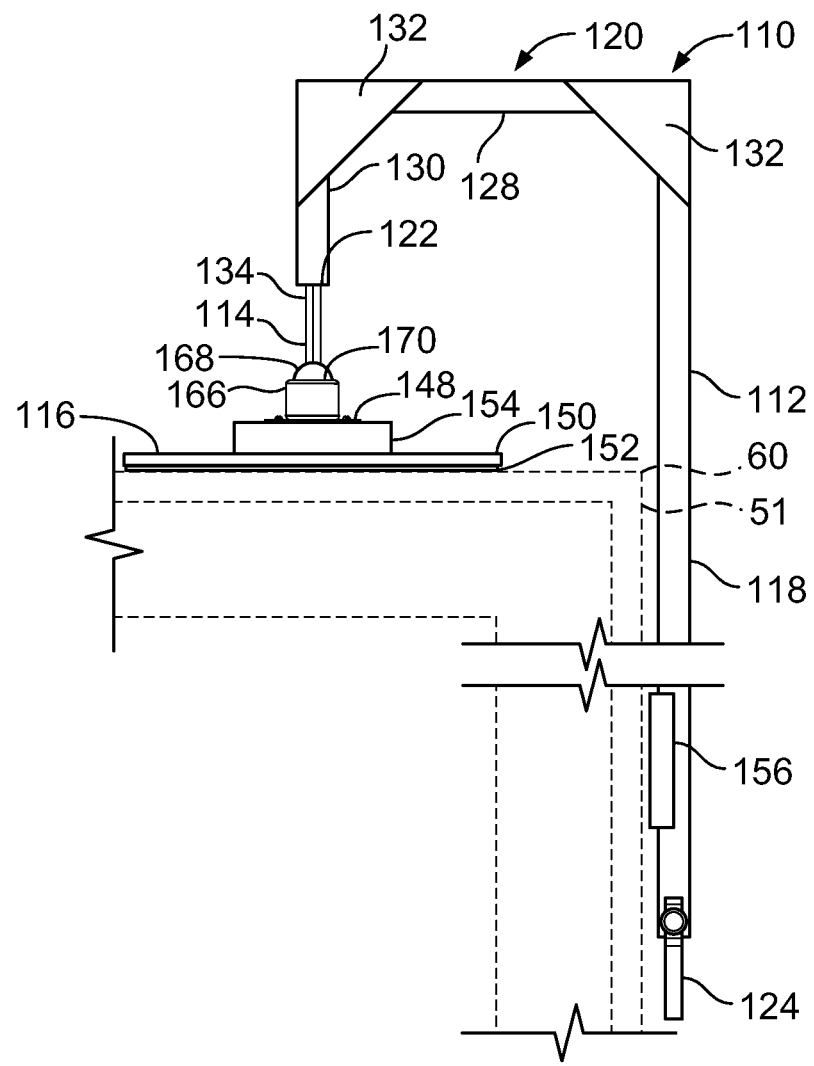
FIG. 5 is a side elevational view of a safety-line anchor depicted in accordance with another embodiment of the invention.

One such configuration is depicted in FIG. 5 in which a safety-line anchor 110 includes a joint 114 comprised of a ball-and-socket coupling 166; in the ball-and-socket coupling the ball 168 is both rotatable and pivotable relative to the socket 170. Other configurations may include universal joints, multi-axis joints, single-axis joints, and combinations of one or more joint configurations, among others. The safety-line anchor 110 includes features similar to those described with for the safety-line anchor 10; such features are provided with reference numerals in the 100 series but with second and third digits matching the corresponding features of the safety-line anchor 10.

The anchor plate 16 includes a force distribution member 50 that aids to distribute forces applied to the body 12 across a portion of the surface of a roof 51 on which the anchor 10 is disposed. The force distribution member 50 is depicted in FIGS. 1-4 as a rectangular member but other shapes—polygonal, curvilinear, or otherwise—may be employed. The force distribution member 50 is preferably of dimensions sufficient to distribute the forces applied thereto across the surface of the roof 51 so as to avoid damaging the roof 51 but also to maintain sufficient frictional engagement with the surface of the roof 51 to avoid sliding movement of the anchor plate 16 relative to the roof 51.

A friction-enhancing layer 52 may be disposed on the operative surface of the force distribution member 50 to increase frictional engagement between the member 50 and the roof surface. The layer 52 may comprise one or more materials such as a rubber, foam, plastic, nylon, composite, or similar material. The materials can be provided as a homogenous, uniform pad as depicted by the layer 152 in FIG. 5, or may be layered, or arranged in a variety of configurations to provide desired frictional engagement and wear properties. As depicted in FIGS. 1-4, the layer 52 may be comprised of a section of carpet or similar fibrous or woven material. The layer 52 may be removably or non-removably affixed to the force-distribution member 50 but is preferably sufficiently affixed to the member 50 to avoid relative movements therebetween during use of the anchor 10.

The anchor plate 16 may further include a reinforcing member 54 coupled to a surface of the force-distribution member 50 opposite the friction-enhancing layer 52. The reinforcing member 54 may provide a location for coupling the anchor plate 16 with the joint 14. The reinforcing member 54 may also distribute the forces applied to the anchor plate 16 across the force-distribution member 50 and may reinforce the member 50 against flexure. In another embodiment, the anchor plate 16 does not include the reinforcing member 54 or includes additional reinforcing members coupled to the force-distribution member 50 in locations at which additional support is needed. The reinforcing member(s) 54 may alternatively be formed integrally with the force-distribution member 50, for example, in the form of ribs, channels, or similar structures.

The safety-line anchor 10 also includes a slide-plate 56 disposed along the length of the shank 18 of the body 12. The slide-plate 56 comprises a generally planar member disposed to extend laterally or perpendicularly to the length of the shank 18 and to lie between the shank 18 and the surface of the roof 51 when the anchor 10 is disposed thereon. Opposite lateral ends of the slide-plate 56 may include ears 58 that are turned up or away from the roof surface. As such, the slide-plate 56 aids lateral sliding movement of the shank 18 across the roof surface when disposed thereon and pivoted about the joint 14 as described below. The ears 58 further aid to avoid the slide-plate 56 from catching on obstructions on the roof surface when sliding thereacross.

With continued reference to FIGS. 1-4, operation of the safety-line anchor 10 is described in accordance with an embodiment of the invention. The anchor 10 is disposed over a peak 60 of the roof 51 with the anchor plate 16 positioned on an anchor side 62 of the peak 60 and the body 12 extending over the peak 60 and toward an opposite second side or working side 64 of the peak 60. The free end of the shank 18 and the coupler 24 coupled thereto are thus disposed on the working side 64 of the peak 60. The anchor plate 16 is positioned with the operative surface of the force-distribution member 50 and/or the friction-enhancing layer 52 in contact with the surface of the roof 51 on the anchor side 62. The anchor 10 is further positioned to place the shank 18 substantially in parallel alignment with the surface of the roof 51 on the working side 64 and to place the slide-plate 56 into contact with surface of the roof 51 on the working side 64.

A first end of the safety line 26 is coupled to the coupler 24 and a second end is coupled to a user. The user is preferably provided with a harness or belt to which the second end of the safety line 26 may be coupled, however the safety line 26 may be directly coupled with the user such as by tying or looping the safety line 26 around the user's waist or torso. The length of the safety line 26 between the coupler 24 and the user is preferably sufficient to enable the user to move within a desired working area of the working side 64 of the roof 51 for carrying out the user's work activities. The length is also sufficiently short to either prevent the user from moving beyond a bottom edge of the working side 64 such as during a fall, or to prevent the user from reaching the ground or other surface underlying the bottom edge of the working side 64, e.g. a falling user is prevented from either leaving the roof surface or from falling to the ground beyond the edge of the roof surface. As described previously, a winch or spool may be provided for controlling the length of the safety line 26 provided to the user.

Figure 4:
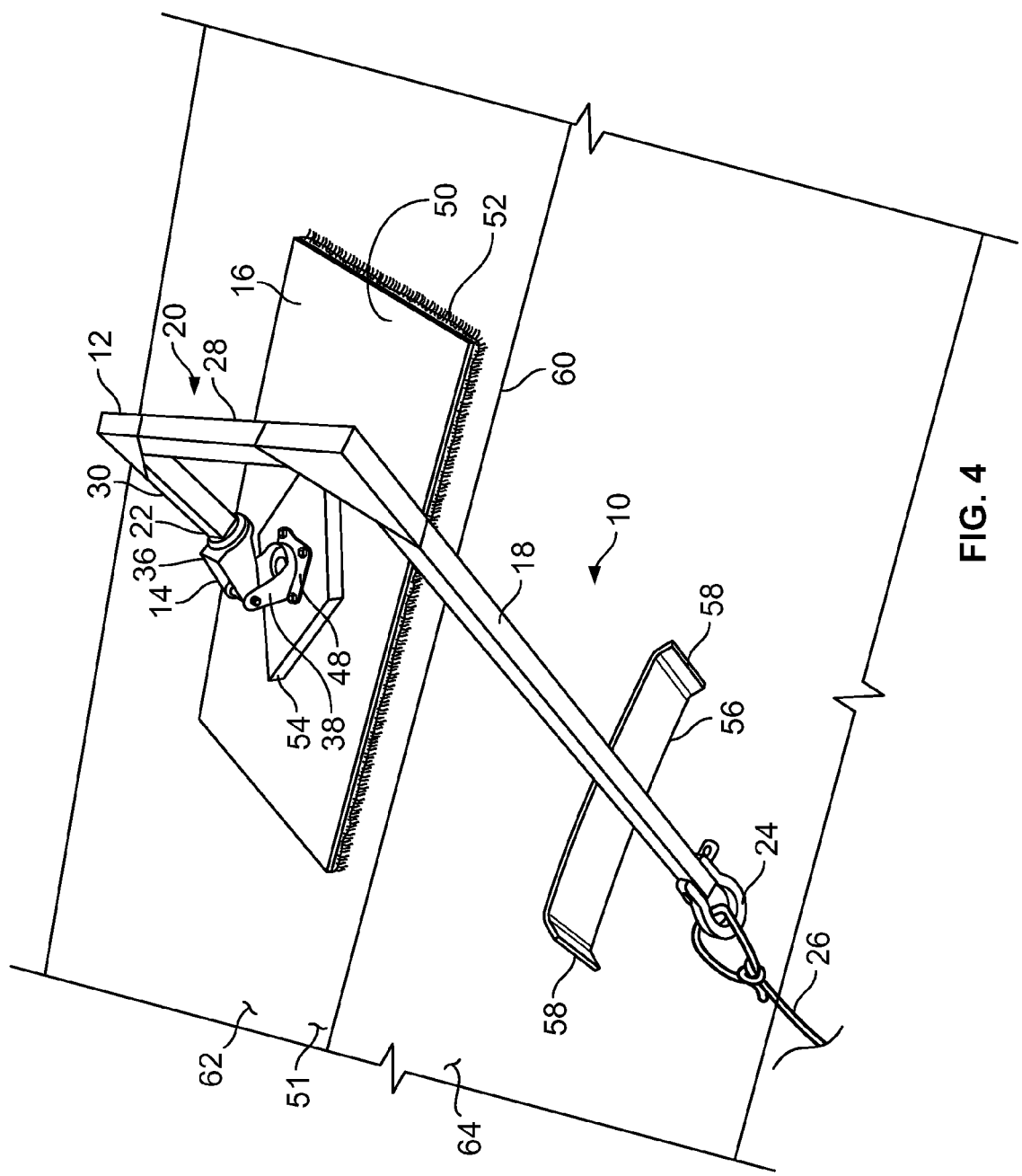
FIG. 4 is a front side perspective view of the safety-line anchor of FIG. 1 disposed over a peak of a roof and pivoted to one side in accordance with an embodiment of the invention.

The user may thus carry out his or her activities within the working area of the roof 51 as provided by the length of the safety line 26. As the user moves laterally within the working area relative to the anchor 10, the rotation and pivoting enabled by the joint 14 allows the body 10 to pivot relative to the anchor plate 16 and remain substantially in line with a tension force applied thereon by the safety line 26, as depicted in FIG. 4. The anchor plate 16 remains in full contact and engagement with the surface of the roof 51 on the anchor side 62. The frictional engagement between the anchor plate 16 and the roof surface may thus remain at or near a maximum no matter the position of the user relative to the anchor 10 and/or the orientation of the body 12 relative to the anchor plate 16. Additionally, the freedom of movement of the body 12 relative to the anchor plate 16 may reduce the risk of the anchor plate 16 being lifted away from the roof surface by lateral and/or rotational forces applied to the anchor 10.

When it is desired to move to a new working area, the anchor 10 may be moved to a new position along the peak 60 by simply picking up the anchor 10 and repositioning the anchor 10 in another desired location. The pivotal and rotational movement enabled by the joint 14 enable the anchor 10 to adapt to varied roof pitches or slopes by providing a wide range of angular orientation between the anchor plate 16 and the body 12. These movements also enable use of the anchor 10 on peaks, hips, or other roof forms or features.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A safety-line anchor comprising:
    a hooked body having a free end and a point, the free end and the point being directed in substantially the same direction, wherein the free end is adapted to retain a safety line;
    an anchor plate configured to engage a roof surface;
    a joint disposed between the point and the anchor plate and enabling rotational and pivotal movement of the body relative to the anchor plate; and a slide-plate disposed along the length of the hooked body, the slide-plate comprising a substantially planar section extending perpendicularly to the length of a shank portion of the hooked body and configured to contact a roof surface during use of the safety-line anchor.

2. The safety-line anchor of claim 1, wherein the slide-plate includes a sliding surface that is directed toward the roof surface when the safety-line anchor is disposed thereon, and wherein the slide-plate includes a pair of ears disposed along opposite distal edges of the slide-plate and extending away from the sliding surface.

3. The safety-line anchor of claim 1, wherein the joint comprises a pair of rotatable couplings and a pivotal coupling disposed between the rotatable couplings.

4. The safety-line anchor of claim 3, wherein the pivotal coupling is offset from the axis of rotation of each of the rotatable couplings.

5. The safety-line anchor of claim 3, wherein the joint includes a first member coupled to a first of the rotatable couplings at a first end of the first member, a second member coupled to a second of the rotatable couplings at a first end of the second member, and the first and second members are pivotably coupled together at their opposite second ends.

6. The safety-line anchor of claim 1, wherein the anchor plate includes a friction-enhancing layer disposed on an operative surface of the anchor plate, the operative surface being directed toward the roof surface when the safety-line anchor is disposed thereon.

7. The safety-line anchor of claim 1, further comprising a coupler coupled to the free end of the body and a safety-line coupled between the coupler and a user.

8. The safety-line anchor of claim 1, wherein the safety-line anchor is disposed on the surface of the roof with the anchor plate being positioned to a first side of a peak of the roof and the free end of the body being positioned to overlie the surface of the roof on a second side of the peak.

9. A safety-line anchor comprising:
a hooked body including a shank with a free end, a bend extending from an opposite end of the shank, and a point at a distal end of the bend, the free end and the point being directed in substantially the same direction, wherein the free end is adapted to retain a safety line;
an anchor plate configured to frictionally engage a roof surface; and
a joint disposed between the point and the anchor plate and enabling rotational and pivotal movement of the body relative to the anchor plate; and
a slide-plate disposed along the length of the shank and configured to contact and slide along the roof surface during use of the safety-line anchor.

10. The safety-line anchor of claim 9, wherein the safety-line anchor is disposed on the surface of the roof with the anchor plate being positioned to a first side of a peak of the roof and the free end of the shank being positioned to overlie the surface of the roof on a second side of the peak.

11. The safety-line anchor of claim 9, wherein the anchor plate includes a friction-enhancing layer disposed on an operative surface of the anchor plate, the operative surface being directed toward the roof surface when the safety-line anchor is disposed thereon.

12. The safety-line anchor of claim 9, wherein the joint comprises a pair of rotatable couplings and a pivotal coupling disposed between the rotatable couplings.

13. The safety-line anchor of claim 12, wherein the pivotal coupling is offset from the axis of rotation of each of the rotatable couplings.

14. A safety-line anchor comprising:
a hooked body including a shank with a free end, a bend extending from an opposite end of the shank, and a point at a distal end of the bend, the free end and the point being directed in substantially the same direction, and the free end overlying a roof surface on a first side of a peak of the roof surface, wherein the free end is adapted to retain a safety line;
an anchor plate frictionally engaged on the roof surface on a second side of the peak; and
a joint disposed between the point and the anchor plate and enabling rotational and pivotal movement of the body relative to the anchor plate; and
a slide-plate disposed along the length of the shank, the slide-plate extending perpendicularly to the length of the shank and configured to contact and slide along the roof surface on the first side of the peak.

15. The safety-line anchor of claim 14, further comprising a coupler coupled to the free end of the shank and a safety line coupled between the coupler and a user.

16. The safety-line anchor of claim 14, wherein the joint comprises a pair of rotatable couplings and a pivotal coupling disposed between the rotatable couplings, and wherein the pivotal coupling is offset from the axis of rotation of each of the rotatable couplings.

17. The safety-line anchor of claim 14, wherein the anchor plate includes a friction-enhancing layer disposed between the anchor plate and the surface of the roof.

\* \* \* \* \*